Figure 1:
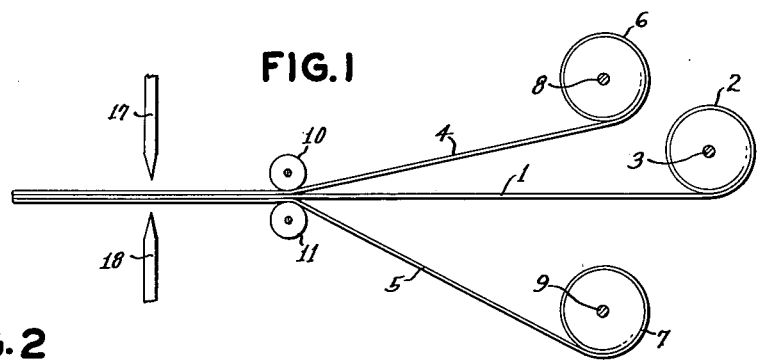

Oct. 9, 1962 O. W. LANGHANS 3,057,057
METHOD OF MAKING A HONEYCOMB SANDWICH STRUCTURE
Filed Oct. 1, 1958

INVENTOR.
OTTO W. LANGHANS
BY Karl Huber
James E. Bryan
ATTORNEYS

Header omitted 3,057,057
METHOD OF MAKING A HONEYCOMB
SANDWICH STRUCTURE
Otto W. Langhans, Madison, N.J., assignor, by mesne assignments, to Engelhard Industries, Inc., Newark, N.J., a corporation of Delaware
Filed Oct. 1, 1958, Ser. No. 764,713
2 Claims. (Cl. 29—475)

The present invention deals with a sandwich structure having a cellular core, known as honeycomb metal, and the method of manufacture thereof.

In the manufacture of cellular metal cores of the honeycomb type for sandwich structural panels or the like, a known method is to successively bond one metal strip to another at spaced intervals along the lengths thereof and form a stack of such bonded strips. Thereafter, the metal stack is expanded to provide interconnected cells in the form of a honeycomb. Another method is to provide a stack of metal strips with a preliminary bonding material positioned between the strip layers at longitudinally spaced intervals. The stack is subjected to bonding temperatures and pressures and after bonding it is expanded into a honeycomb structure and subsequently brazed at the honeycomb cell joints.

After forming the honeycomb core, the core is sandwiched between two metal sheets or skins covering and enclosing the cells to provide a structural panel. The usual method is to place a thin sheet of brazing metal between the skins and core and braze the assembly. Such a method has the disadvantage that the brazing metal is coextensive with the skin area and, under brazing temperatures, the excess brazing metal flows along the joints between the skins and honeycomb core and results in nodular fillets along the joints. Apart from the excess brazing metal adding to the weight of the finished panel, there is the undesirable necessity of employing sufficient controlled pressure during brazing to extrude excess brazing material from between the skins and honeycomb to assure a smooth and even skin surface. Also, the excess brazing material conducts heat and limits the effectiveness of the structure as a heat barrier.

Figure 2:
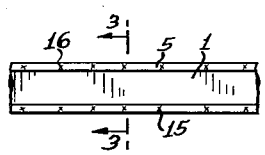
Figure 4:
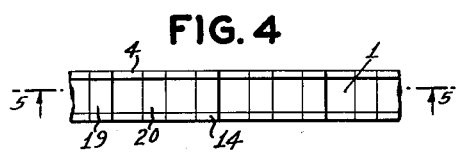
Figures 3, 6:
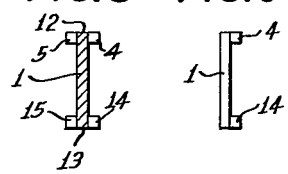
Figure 5:
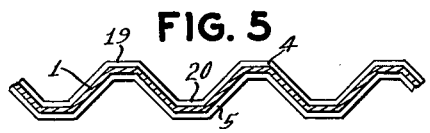
Figure 7:
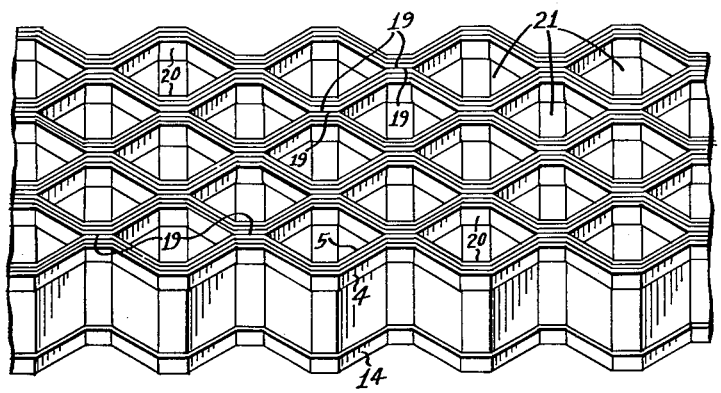
Figure 8:
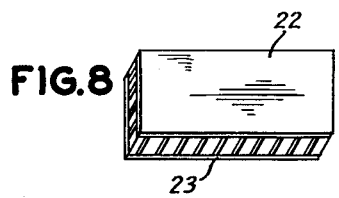

It is an object of the present invention to provide a sandwich structure having a honeycomb core, and the method of manufacture thereof, wherein the metal for brazing the assembly is present in an optimum controlled amount only at the joint areas. It is another object of the present invention to provide a sandwich structure having a honeycomb core, wherein the assembly is brazed and characterized by uniformly brazed joints. It is a further object of the invention to provide a sandwich structure having a cellular core, wherein the sandwiching skins or sheets present a smooth surface. It is a still further object of the invention to provide a sandwich structure having a cellular core, wherein the complemental parts thereof are in a prefabricated condition and ready for assembly by a single brazing operation. Other objects and advantages of the invention will become apparent from the description hereinafter following and the drawing forming a part hereof, in which:

FIGURE 1 is a schematic illustration showing a method of forming a composite strip component of the structure according to the invention, FIGURE 2 illustrates a fragmentary top view of the composite strip component of the structure of the invention, FIGURE 3 illustrates a cross sectional view along the lines 3—3 of FIGURE 2, FIGURE 4 illustrates a fragmentary top view of the composite strip in substantially corrugated form, FIGURE 5 illustrates a cross sectional view along lines 5—5 of FIGURE 4, FIGURE 6 illustrates an end view of a modified composite strip, FIGURE 7 illustrates a perspective view of a honeycomb core structure formed from a plurality of the strips of FIGURES 4 and 5, and FIGURE 8 illustrates a perspective view of a sandwich structure according to the invention.

The invention relates to a sandwich structure having a cellular core and the method of manufacture thereof, whereby the cellular core is in the form of a honeycomb formed from preformed composite metal strips comprising a brazing alloy particularly positioned for brazing the honeycomb between a pair of cell enclosing metal sheets or skins in a single brazing operation.

Regarding FIGURE 1, a metal strip 1 composed, for example, of austenitic or martensitic stainless steel or titanium, is provided preferably in the form of a coil 2 supported on shaft 3. Narrow bands 4 and 5 of brazing metal are provided, preferably in the form of coils 6 and 7 mounted on shafts 8 and 9, respectively. The narrow brazing metal bands 4 and 5, together with the wider metal strip 1 positioned therebetween, are passed from the coils 2, 6 and 7 between a pair of guide rolls 10 and 11 with the narrow bands 4 and 5 having their longitudinal edges vertically aligned with or in a common vertical plane with one longitudinal edge 12 of the wider strip 1, as illustrated by FIGURES 2 and 3. The other longitudinal edge 13 of strip 1 is similarly associated with narrow brazing metal bands 14 and 15, which may be applied simultaneously with the bands 4 and 5. The laterally spaced parallel bands positioned on the strip 1 along the longitudinal edges thereof are composed of brazing alloys such as Ag 92.5%-Cu 7.3%-Li 0.2%, Ag 85%-Mn 15%, Pd 60%-Cu 40%, or any of the well known Au-Ni, Au-Ni-Cr, Ni-Mn, Ag-Pd, Ag-Pd-Mn and similar brazing alloys. The bands on opposite sides of the strip 1 are preferably preliminarily secured to the strip by spot welding, as at 16, as they pass between welding electrodes 17 and 18. After spot welding, the composite strip is cut to predetermined lengths and pressed into a substantially corrugated form as illustrated by FIGURES 4 and 5.

The composite strip may be modified by the provision of the parallel bands 4 and 14 on one side only of the strip 1, as illustrated by FIGURE 6.

The corrugations of the composite strip comprise projections as at 19 and depressions as at 20.

Having provided the composite strip, as illustrated by FIGURES 4 and 5, a honeycomb structure according to FIGURE 7 is assembled by mating the projections 19 on one composite strip with the projections of another strip and tack welding the strips along the mated projections along the width of the strip 1. A plurality of composite strips are welded together in this manner forming a honeycomb structure as illustrated by FIGURE 7.

The prefabricated strips according to FIGURES 4 and 5 may be provided with the corrugations having either substantially deep or shallow indentations. In the case of shallow depressions 20, the composite strips are welded into a honeycomb structure and the honeycomb is subsequently expanded, according to known procedure, to provide cells 21 of desirable spacing.

After the honeycomb structure has been prepared, it is sandwiched between a pair of sheets or skins 22 and 23 with the sheets enclosing or covering the cells 21. Since the longitudinal edges of the bands 4, 5, 14 and 15 are in a common plane with the longitudinal edges 12 and 13 of strip 1, the skins 22 and 23 are positioned on contact with the surfaces of edges 12 and 13 and the sandwiched struc- is brazed, for example, by heat treating in a furnace under suitable atmosphere conditions in known manner. During brazing, since an optimum amount of brazing metal is provided by properly dimensioning the bands 4, 5, 14 and 15, the molten brazing alloy wets and flows between the interconnecting joints between the skins 22 and 23 and edges 12 and 13, as well as the welded joints between the projections 19.

It is therefore apparent that the entire assembly including strips and skins are simultaneously brazed with a single brazing operation.

While the invention is described in accordance with the particular illustrations, various modifications are contemplated within the scope of the appended claims.

What is claimed is:

1. The method of forming a sandwich structure comprising forming a composite strip by securing laterally spaced parallel narrow metal bands of brazing metal on both sides of a wider metal strip with each band adjacent a longitudinal edge thereof, corrugating the composite strip transversely along the longitudinal length thereof, the corrugations comprising projections and depressions, mating the projections of a plurality of such strips to form a series of cells therebetween in the form of a honeycomb, connecting the strips to each other along the projections, sandwiching the honeycomb between a pair of metal sheets, the sheets enclosing the honeycomb cells and contacting the brazing metal bands, and subjecting the sandwich structure to brazing conditions whereby the brazing metal flows between the mated projections and between the sheets and the honeycomb to braze the projections to each other and the sheets to the honeycomb in a single brazing operation.

2. The method according to claim 1, comprising expanding the honeycomb core prior to brazing.

References Cited in the file of this patent

UNITED STATES PATENTS

| | | |
|---|---|---|
| 2,441,476 | Ewald | May 11, 1948 |
| 2,475,566 | Karmazin | July 5, 1949 |
| 2,609,068 | Pajak | Sept. 2, 1952 |
| 2,699,599 | Potchen | Jan. 18, 1955 |
| 2,746,139 | Van Pappelendam | May 22, 1956 |
| 2,756,496 | Holland | July 31, 1956 |
| 2,796,157 | Ginsburg | June 18, 1957 |
| 2,816,355 | Herman | Dec. 17, 1957 |
| 2,900,713 | Young | Aug. 25, 1959 |

FOREIGN PATENTS

| | | |
|---|---|---|
| 750,610 | Great Britain | June 20, 1956 |